United States Patent
Kim et al.

(10) Patent No.: US 12,295,277 B2
(45) Date of Patent: May 13, 2025

(54) METHOD AND DEVICE FOR PREDICTING POTENTIAL ACCIDENT OF AGRICULTURAL MACHINE THAT PERFORMS AUTONOMOUS DRIVING AND OPERATES PTO, AND CONTROLLING OPERATION TO AVOID POTENTIAL ACCIDENT, IN COMMUNICATION SYSTEM

(71) Applicant: GINT CO., LTD., Gyeonggi-do (KR)

(72) Inventors: Yong Hyeon Kim, Gyeonggi-do (KR);
Seung Rak Son, Gyeonggi-do (KR)

(73) Assignee: GINT CO., LTD., Gyeonggi-do (KR)

( * ) Notice: Subject to any disclaimer, the term of this patent is extended or adjusted under 35 U.S.C. 154(b) by 0 days.

(21) Appl. No.: 18/763,097

(22) Filed: Jul. 3, 2024

(65) Prior Publication Data
US 2024/0349638 A1 Oct. 24, 2024

Related U.S. Application Data

(63) Continuation of application No. PCT/KR2023/004044, filed on Mar. 27, 2023.

(30) Foreign Application Priority Data

Apr. 20, 2022 (KR) .......................... 10-2022-0049021

(51) Int. Cl.
*A01B 69/04* (2006.01)
*A01B 71/02* (2006.01)

(52) U.S. Cl.
CPC ............ *A01B 69/008* (2013.01); *A01B 71/02* (2013.01)

(58) Field of Classification Search
CPC .............................. A01B 69/008; A01B 71/02
See application file for complete search history.

(56) References Cited

U.S. PATENT DOCUMENTS 5,974,348 A * 10/1999 Rocks .................... A01D 46/30
701/28
6,278,918 B1 * 8/2001 Dickson ............... G06V 20/588
701/28

(Continued)

FOREIGN PATENT DOCUMENTS

JP     2017204061 A    11/2017
JP     2019097454 A     6/2019

(Continued)

OTHER PUBLICATIONS

International Search Report for Corresponding PCT Application No. PCT/KR2023/004044, Mar. 27, 2023, 3 pages.

(Continued)

*Primary Examiner* — Mussa A Shaawat
(74) *Attorney, Agent, or Firm* — Guntin & Gust, PLC; Miyoung Shin

(57) ABSTRACT

The present disclosure relates to a method and device for predicting a potential accident of an agricultural machine that performs autonomous driving and operates a power take-off (PTO), and controlling an operation to avoid a potential accident, in a communication system. Embodiments of the present disclosure determine a probability of occurrence and predicted severity of a potential accident according to a change in distance to a person or an obstacle over time in an agricultural machine that performs autonomous driving and operates the PTO, and, when the probability of occurrence is greater than a threshold probability, notify a user terminal after taking proactive measures to avoid the accident according to the predicted severity, or initially notifying the user terminal of a recommended operation for avoiding the accident and then performing post measures for accident avoidance on the basis of an operation received from the user terminal.

4 Claims, 7 Drawing Sheets

(56) References Cited

U.S. PATENT DOCUMENTS

| | | | | | |
|---|---|---|---|---|---|
| 6,336,051 | B1* | 1/2002 | Pangels | ............... | A01B 79/005 700/207 |
| 6,385,515 | B1* | 5/2002 | Dickson | ............... | G06V 20/588 701/28 |
| 6,445,983 | B1* | 9/2002 | Dickson | ............... | G05D 1/0274 701/472 |
| 6,686,951 | B1* | 2/2004 | Dickson | ............... | G06V 20/38 348/120 |
| 6,907,336 | B2* | 6/2005 | Gray | ............... | G05D 1/0217 701/25 |
| 8,180,514 | B2* | 5/2012 | Kaprielian | ............... | G05D 1/027 701/50 |
| 9,288,938 | B2* | 3/2016 | Cavender-Bares | .. | A01B 69/008 |
| 2012/0087771 | A1* | 4/2012 | Wenzel | ............... | A01F 12/50 414/808 |
| 2013/0019580 | A1* | 1/2013 | Anderson | ............... | A01D 45/10 56/11.2 |
| 2014/0324291 | A1* | 10/2014 | Jones | ............... | G01S 19/44 701/41 |
| 2015/0051779 | A1* | 2/2015 | Camacho-Cook | ... | A01B 69/008 701/23 |
| 2020/0375083 | A1* | 12/2020 | Anderson | ............... | G01N 33/0063 |
| 2021/0105995 | A1* | 4/2021 | Palomares | ............... | A01B 39/18 |
| 2021/0149406 | A1* | 5/2021 | Javault | ............... | A01C 21/005 |
| 2021/0243940 | A1* | 8/2021 | Snyder | ............... | A01M 21/02 |
| 2023/0252791 | A1* | 8/2023 | Webb | ............... | G06V 10/776 382/159 |

FOREIGN PATENT DOCUMENTS

| | | |
|---|---|---|
| KR | 101573027 B1 | 11/2015 |
| KR | 102166707 B1 | 10/2020 |
| KR | 102339667 B1 | 12/2021 |
| KR | 102384216 B1 | 4/2022 |
| KR | 102458856 B1 | 10/2022 |

OTHER PUBLICATIONS

Notice of Allowance for corresponding Korean Application No. 10-2022-0049021 and English translation, Sep. 5, 2022, 5 pages.

Office Action for corresponding Korean Application No. 10-2022-0049021 and English translation, Aug. 9, 2022, 7 pages.

* cited by examiner

METHOD AND DEVICE FOR PREDICTING POTENTIAL ACCIDENT OF AGRICULTURAL MACHINE THAT PERFORMS AUTONOMOUS DRIVING AND OPERATES PTO, AND CONTROLLING OPERATION TO AVOID POTENTIAL ACCIDENT, IN COMMUNICATION SYSTEM

CROSS-REFERENCE TO RELATED APPLICATION

This application is a continuation of PCT Application No. PCT/KR2023/004044, filed Mar. 27, 2023, which claims priority to and the benefit of Korean Patent Application No. 10-2022-0049021, filed Apr. 20, 2022, the disclosures of which are incorporated herein by reference in their entirety.

FIELD OF THE DISCLOSURE

The present disclosure relates to a method and device for predicting a potential accident of an agricultural machine that performs autonomous driving and operates a power take-off (PTO), and controlling an operation to avoid potential accidents, in a communication system. More particularly, the present disclosure relates to a method and device for determining the probability of occurrence and predicted severity of a potential accident according to a change in distance to a person or an obstacle over time in an agricultural machine that performs autonomous driving and operates a PTO, and, when the probability of occurrence is greater than a threshold probability, notifying a user terminal after taking proactive measures to avoid the accident according to the predicted severity, or initially notifying the user terminal of a suggested operation for avoiding the accident and then performing post measures for accident avoidance on the basis of an operation received from the user terminal. Explanation on State-Supported Research and Development The research of the present disclosure has been conducted under the supervision of the Korea Institute of Agriculture, Food and Rural Affairs Planning and Evaluation under the funding support of Advanced Agricultural Machinery Industrialization Technology Development Research Project of Ministry of Agriculture, Food and Rural Affairs of the Republic of Korea (Project identification number: 1545022226, Detailed Project Number: 320025031SB010, Research Project Name: Development of agricultural machinery management technology based on blockchain technology).

DISCUSSION OF RELATED ART

Agricultural machines are treated as a very important element to reduce high labor burden and production costs in response to labor shortages due to the decline and aging of working population in rural areas. The agricultural machines perform various tasks necessary for farming, and are capable of performing various types of work such as plowing, rotary work, pest control, and transplanting work, and are classified into walk-behind work machines that workers operate while walking along with the agricultural machines and riding-type work machines where workers sit on driver's seats provided on the agricultural machines and operates the agricultural machines.

With the development of wireless communication technology, telematics devices, which are electrically connected to the agricultural machines and may wirelessly communicate agricultural machine-related status and control information with servers such as agricultural machine manufacturers, are becoming popular. By using the telematics devices, users may control an operation of the agricultural machines without having to go directly to the agricultural machines.

With the development of wireless communication technology such as smartphones, applications are used to acquire information on the current status and surrounding environment of distant agricultural machines through the communication with the server and control the autonomous driving of the agricultural machines, thereby allowing the agricultural operation to perform wirelessly.

Power take off (PTO) of the operating agricultural machines may be a frequent cause of accidents. Prediction and avoidance control of the PTO accidents in the agricultural machines that are autonomously driving without the driver riding the agricultural machines are important issues that should be solved for safe autonomous driving of the agricultural machines. By using communication between users and agricultural machines in the communication system, it is possible to provide information on possible avoidance operations to users according to a predicted severity of potential accidents, take actions to avoid accidents or immediately first take actions to avoid accidents according to the user's selection, and then report the actions taken to avoid the accidents to the users.

Therefore, there is a need for a method and device for predicting a potential accident of an agricultural machine that performs autonomous driving and operates a PTO, and controlling an operation to avoid the potential accident, in a communication system.

SUMMARY

Based on the above discussion, various embodiments of the present disclosure provide a method and device for predicting a potential accident of an agricultural machine that performs autonomous driving and operates a power take off (PTO), and controlling an operation to avoid the potential accident.

Various embodiments of the present disclosure provide a method and device for determining a probability of occurrence and predicted severity of a potential accident according to a change in distance to a person or an obstacle over time in an agricultural machine that performs autonomous driving and operates a PTO, and, when the probability of occurrence is greater than or equal to a threshold probability, an operation of accident avoidance according to the predicted severity.

Various embodiments of the present disclosure provide a method and device for avoiding a potential accident by differentially determining operations to avoid an accident according to each range to which a predicted severity belongs, and performing controllable operation by performing a controllable operation when a normal operation is confirmed among the differently determined operations.

Various embodiments of the present disclosure provides a method and device for providing information on possible avoidance operations to a user according to a predicted severity of a potential accident, taking action to avoid an accident or immediately first taking action to avoid an accident according to a user's selection, and then reporting the action taken to avoid the accident to the user, by using communication between a user and an agricultural machine in a communication system.

According to various embodiments of the present application, in a method of operating an automated-driving control unit (ACU) device electrically connected to an agricultural machine including a power take off (PTO) in a communication system, the ACU device includes a processor, a memory, a transceiver, and an infrared sensor and is electrically connected to a camera in the agricultural machine. The method includes detecting an obstacle or person within a predetermined distance from the PTO by at least one of the infrared sensor and the camera while the agricultural machine performs autonomous driving and the PTO operates, determining a probability of occurrence of a potential accident and a predicted severity of the potential accident based on a change in distance from the PTO to the obstacle or person over time, determining whether a vehicle control unit (VCU) device electrically connected to a steering device of the agricultural machine is operating normally, whether a PTO control device electrically connected to the PTO is operating normally, and an engine control unit (ECU) device electrically connected to a driving device of the agricultural machine is operating normally, determining a suggested operation for at least one of control of the steering device through the VCU device, control of the PTO through the PTO control device, control of the PTO through the PTO control device, and control of the driving device through the ECU device based on the probability of occurrence of the potential accident and the predicted severity of the potential accident, determining one operation direction of proactive measure post-report or proactive report post-measure based on the probability of occurrence of the potential accident and the predicted severity of the potential accident, when the proactive measure post-report is determined to be the operation direction, performing one of the one or more suggested operations and transmitting information on the probability of occurrence of the potential accident, the predicted severity of the potential accident, and a fact of performance of the one of the one or more suggested operations to a user terminal through the transceiver, and when the proactive report post-measure is determined based on the operation direction, transmitting information on the probability of occurrence of the potential accident, the predicted severity of the potential accident, and the one or more suggested operations to the user terminal, when instruction information for one of the one or more suggested operations is received from the user terminal within a predetermined time, performing one operation according to the instruction information, and when the instruction information for one of the one or more suggested operations is not received from the user terminal within the predetermined time, performing one of the one or more suggested operations and transmitting the information on the probability of occurrence of the potential accident, the predicted severity of the potential accident, and the fact of performance of the one of the one or more suggested operations to the user terminal through the transceiver.

In one embodiment, the control of the steering device through the VCU device may include steering control of the agricultural machine in a direction to avoid the potential accident. The control of the PTO through the PTO control device may include driving stop control of the PTO. The control of the driving device through the ECU device may include driving stop control of the agricultural machine.

In one embodiment, the probability of occurrence of the potential accident may be determined to be a probability of collision between the PTO and the obstacle or person based on the change in distance from the PTO to the obstacle or person over time, and the predicted severity of the potential accident may be determined based on a predicted impact amount when the PTO collides with the obstacle or person based on a change in relative speed of the PTO with respect to the obstacle or person over time.

In one embodiment, in the method of operating an ACU device electrically connected to an agricultural machine including a PTO in the communication system, the determining of the one or more suggested operations may be performed when the probability of occurrence of the potential accident is greater than or equal to a threshold probability. The determining of the one or more suggested operations may include, when the predicted severity is greater than or equal to a first critical severity and less than a second critical severity, determining the one or more suggested operations for control of the steering device, controlling the PTO, and control of the driving device, when the predicted severity is greater than or equal to the second critical severity and less than a third critical severity, determining the one or more suggested operations for control of the PTO and control of the driving device, and when the predicted severity is greater than or equal to a third critical severity, determining the one or more suggested operations for control of the driving device. The third critical severity may be greater than the second critical severity and the first critical severity, and the first critical severity may be lower than the third critical severity and the second critical severity.

In one embodiment, the determining of the one or more suggested operations may include, when the predicted severity is greater than or equal to the first critical severity and less than the second critical severity, determining the one or more suggested operations for control of the steering device through the VCU device and control of the PTO through the PTO control device when the VCU operates normally, determining the one or more suggested operations for control of the PTO through the PTO control device when the VCU does not operate normally and the PTO control device operates normally, and determining an operation to avoid an accident under of control of the driving device through the ECU device when the VCU and the PTO control device do not operate normally and the ECU device operates normally.

In one embodiment, the determining of the one or more suggested operations may include, when the predicted severity is greater than or equal to the second critical severity and less than the third critical severity, determining the one or more suggested operations for control of the PTO through the PTO control device and controlling the driving device through the ECU device when the PTO control device operates normally, and determining the one or more suggested operations for control of the driving device through the ECU device when the PTO control device does not operate normally and the ECU device operates normally.

In one embodiment, when the proactive measure post-report is determined to be the operation direction, or when the proactive report post-measure is determined to be the operation direction and the instruction information for one of the one or more suggested operations is not received from the user terminal within the predetermined time, the performing of one of the one or more suggested operations may include performing an operation with a highest priority among the one or more suggested operations. Here, priorities may be in the order of the control of the steering device through the VCU device, the control of the PTO through the PTO control device, and the control of the driving device through the ECU device, and the priority of the control of the steering device through the VCU device may be highest, and the priority of the control of the driving device through the ECU device may be lowest.

In one embodiment, it may be determined whether the VCU device operates normally, whether the PTO control device operates normally, and whether the ECU device operates normally by transmitting a normal operation confirmation request signal from the ACU device to the VCU device, the PTO control device, and the ECU device, respectively, and then receiving, by the ACU device, a normal operation confirmation signal from each of the VCU device, the PTO control device, and the ECU device.

According to various embodiments of the present application, in a method of operating an ACU device electrically connected to an agricultural machine including a PTO in a communication system, the ACU device may include a processor, a memory, a transceiver, and an infrared sensor and may be electrically connected to a camera in the agricultural machine. The processor may be configured to perform the method of operating an ACU device electrically connected to an agricultural machine including a PTO in the communication system according to the above-described embodiments.

According to various embodiments of the present application, a computer program may be configured to perform a method of operating an ACU device electrically connected to an agricultural machine including a PTO in the communication system, and may be recorded in a computer-readable storage medium.

According to various embodiments of the present disclosure, in a method of operating an ACU device electrically connected to an agricultural machine including a PTO in a communication system, the ACU device includes a processor, a memory, a transceiver, and an infrared sensor and is electrically connected to a camera in the agricultural machine. The method includes detecting an obstacle or person within a predetermined distance from the PTO by at least one of the infrared sensor and the camera while the agricultural machine performs autonomous driving and the PTO operates, determining a probability of occurrence of a potential accident and a predicted severity of the potential accident based on a change in distance from the PTO to the obstacle or person over time, determining whether a VCU device electrically connected to a steering device of the agricultural machine is operating normally, whether a PTO control device electrically connected to the PTO is operating normally, and an ECU device electrically connected to a driving device of the agricultural machine is operating normally, determining a suggested operation for at least one of control of the steering device through the VCU device, control of the PTO through the PTO control device, control of the PTO through the PTO control device, and control of the driving device through the ECU device based on the probability of occurrence of the potential accident and the predicted severity of the potential accident, determining one operation direction of proactive measure post-report or proactive report post-measure based on the probability of occurrence of the potential accident and the predicted severity of the potential accident, when the proactive measure post-report is determined to be the operation direction, performing one of the one or more suggested operations and transmitting information on the probability of occurrence of the potential accident, the predicted severity of the potential accident, and a fact of performance of the one of the one or more suggested operations to a user terminal through the transceiver, and when the proactive report post-measure is determined based on the operation direction, transmitting information on the probability of occurrence of the potential accident, the predicted severity of the potential accident, and the one or more suggested operations to the user terminal, when instruction information for one of the one or more suggested operations is received from the user terminal within a predetermined time, performing one operation according to the instruction information, and when the instruction information for one of the one or more suggested operations is not received from the user terminal within the predetermined time, performing one of the one or more suggested operations and transmitting the information on the probability of occurrence of the potential accident, the predicted severity of the potential accident, and the fact of performance of the one of the one or more suggested operations to the user terminal through the transceiver.

Here, the control of the steering device through the VCU device may include steering control of the agricultural machine in a direction to avoid the potential accident. The control of the PTO through the PTO control device may include driving stop control of the PTO. The control of the driving device through the ECU device may include driving stop control of the agricultural machine. In addition, in some embodiments, the probability of occurrence of the potential accident may be determined to be a probability of collision between the PTO and the obstacle or person based on the change in distance from the PTO to the obstacle or person over time. The predicted severity of the potential accident may be determined based on a predicted impact amount when the PTO collides with the obstacle or person based on a change in relative speed of the PTO with respect to the obstacle or person over time. In addition, in some embodiments, a method of operating an ACU device electrically connected to an agricultural machine including a PTO in a communication system, the ACU device may include a processor, a memory, a transceiver, and an infrared sensor and may be electrically connected to a camera in the agricultural machine. In addition, the processor may be configured to perform the method of operating an ACU device electrically connected to an agricultural machine including a PTO in the communication system according to the above-described embodiments. In addition, in some embodiments, a computer program may be configured to perform a method of operating an ACU device electrically connected to an agricultural machine including a PTO in the communication system, and may be recorded in a computer-readable storage medium.

According to various embodiments of the present application, in a method of operating an ACU device electrically connected to an agricultural machine including a PTO in a communication system, the ACU device includes a processor, a memory, a transceiver, and an infrared sensor and is electrically connected to a camera in the agricultural machine. The method includes detecting an obstacle or person within a predetermined distance from the PTO by at least one of the infrared sensor and the camera while the agricultural machine performs autonomous driving and the PTO operates, determining a probability of occurrence of a potential accident and a predicted severity of the potential accident based on a change in distance from the PTO to the obstacle or person over time, determining whether a VCU device electrically connected to a steering device of the agricultural machine is operating normally, whether a PTO control device electrically connected to the PTO is operating normally, and an ECU device electrically connected to a driving device of the agricultural machine is operating normally, determining a suggested operation for at least one of control of the steering device through the VCU device, control of the PTO through the PTO control device, control of the PTO through the PTO control device, and control of the driving device through the ECU device based on the probability of occurrence of the potential accident and the predicted severity of the potential accident, determining one operation direction of proactive measure post-report or proactive report post-measure based on the probability of occurrence of the potential accident and the predicted severity of the potential accident, when the proactive measure post-report is determined to be the operation direction, performing one of the one or more suggested operations and transmitting information on the probability of occurrence of the potential accident, the predicted severity of the potential accident, and a fact of performance of the one of the one or more suggested operations to a user terminal through the transceiver, and when the proactive report post-measure is determined based on the operation direction, transmitting information on the probability of occurrence of the potential accident, the predicted severity of the potential accident, and the one or more suggested operations to the user terminal, when instruction information for one of the one or more suggested operations is received from the user terminal within a predetermined time, performing one operation according to the instruction information, and when the instruction information for one of the one or more suggested operations is not received from the user terminal within the predetermined time, performing one of the one or more suggested operations and transmitting the information on the probability of occurrence of the potential accident, the predicted severity of the potential accident, and the fact of performance of the one of the one or more suggested operations to the user terminal through the transceiver.

The determining of the one or more suggested operations may be performed when the probability of occurrence of the potential accident is greater than or equal to a threshold probability, and the determining of the one or more suggested operations may include, when the predicted severity is greater than or equal to a first critical severity and less than a second critical severity, determining the one or more suggested operations for control of the steering device, control of the PTO, and control of the driving device, when the predicted severity is greater than or equal to the second critical severity and less than a third critical severity, determining the one or more suggested operations for control of the PTO and control of the driving device, and when the predicted severity is greater than or equal to the third critical severity, determining the one or more suggested operations for control of the driving device. The third critical severity may be greater than the second critical severity and the first critical severity, and the first critical severity may be lower than the third critical severity and the second critical severity.

In addition, in some embodiments, the determining of the one or more suggested operations may include, when the predicted severity is greater than or equal to the first critical severity and less than the second critical severity, determining the one or more suggested operations for control of the steering device through the VCU device and control of the PTO through the PTO control device when the VCU operates normally, determining the one or more suggested operations for control of the PTO through the PTO control device when the VCU does not operate normally and the PTO control device operates normally, and determining the one or more suggested operations for control of the driving device through the ECU device when the VCU and the PTO control device do not operate normally and the ECU device operates normally. In addition, in some embodiments, the determining of the one or more suggested operations may include, when the predicted severity is greater than or equal to the second critical severity and less than the third critical severity, determining the one or more suggested operations for control of the PTO through the PTO control device and control of the driving device through the ECU device when the PTO control device operates normally, and determining the one or more suggested operations for control of the driving device through the ECU device when the PTO control device does not operate normally and the ECU device operates normally.

In addition, in some embodiments, a method of operating an ACU device electrically connected to an agricultural machine including a PTO in a communication system, the ACU device may include a processor, a memory, a transceiver, and an infrared sensor and may be electrically connected to a camera in the agricultural machine. In addition, the processor may be configured to perform the method of operating an ACU device electrically connected to an agricultural machine including a PTO in the communication system according to the above-described embodiments. In addition, in some embodiments, a computer program may be configured to perform a method of operating an ACU device electrically connected to an agricultural machine including a PTO in the communication system, and may be recorded in a computer-readable storage medium.

According to various embodiments of the present application, in a method of operating an ACU device electrically connected to an agricultural machine including a PTO in a communication system, the ACU device includes a processor, a memory, a transceiver, and an infrared sensor and is electrically connected to a camera in the agricultural machine. The method includes detecting an obstacle or person within a predetermined distance from the PTO by at least one of the infrared sensor and the camera while the agricultural machine performs autonomous driving and the PTO operates, determining a probability of occurrence of a potential accident and a predicted severity of the potential accident based on a change in distance from the PTO to the obstacle or person over time, determining whether a VCU device electrically connected to a steering device of the agricultural machine is operating normally, whether a PTO control device electrically connected to the PTO is operating normally, and an ECU device electrically connected to a driving device of the agricultural machine is operating normally, determining a suggested operation for at least one of control of the steering device through the VCU device, control of the PTO through the PTO control device, control of the PTO through the PTO control device, and control of the driving device through the ECU device based on the probability of occurrence of the potential accident and the predicted severity of the potential accident; determining one operation direction of proactive measure post-report or proactive report post-measure based on the probability of occurrence of the potential accident and the predicted severity of the potential accident, when the proactive measure post-report is determined to be the operation direction, performing one of the one or more suggested operations and transmitting information on the probability of occurrence of the potential accident, the predicted severity of the potential accident, and a fact of performance of the one of the one or more suggested operations to a user terminal through the transceiver, and when the proactive report post-measure is determined based on the operation direction, transmitting information on the probability of occurrence of the potential accident, the predicted severity of the potential accident, and the one or more suggested operations to the user terminal, when instruction information for one of the one or more suggested operations is received from the user terminal within a predetermined time, performing one operation according to the instruction information, and when the instruction information for one of the one or more suggested operations is not received from the user terminal within the predetermined time, performing one of the one or more suggested operations and transmitting the information on the probability of occurrence of the potential accident, the predicted severity of the potential accident, and the fact of performance of the one of the one or more suggested operations to the user terminal through the transceiver.

When the proactive measure post-report is determined to be the operation direction, or when the proactive report post-measure is determined in the operation direction and the instruction information for one of the one or more suggested operations is not received from the user terminal within the predetermined time, the performing of one of the one or more suggested operations may include performing an operation with a highest priority among the one or more suggested operations. Priorities may be in the order of the control of the steering device through the VCU device, the control of the PTO through the PTO control device, and the control of the driving device through the ECU device, the priority of the control of the steering device through the VCU device may be highest, and the priority of the control of the driving device through the ECU device may be lowest.

In addition, in some embodiment, the probability of occurrence of the potential accident may be determined to be a probability of collision between the PTO and the obstacle or person based on the change in distance from the PTO to the obstacle or person over time, and the predicted severity of the potential accident may be determined based on a predicted impact amount when the PTO collides with the obstacle or person based on a change in relative speed of the PTO with respect to the obstacle or person over time. In addition, in some embodiments, a method of operating an ACU device electrically connected to an agricultural machine including a PTO in a communication system, the ACU device may include a processor, a memory, a transceiver, and an infrared sensor and may be electrically connected to a camera in the agricultural machine. In addition, the processor may be configured to perform the method of operating an ACU device electrically connected to an agricultural machine including a PTO in the communication system according to the above-described embodiments. In addition, in some embodiments, a computer program may be configured to perform a method of operating an ACU device electrically connected to an agricultural machine including a PTO in the communication system, and may be recorded in a computer-readable storage medium.

According to various embodiments of the present application, in a method of operating an ACU device electrically connected to an agricultural machine including a PTO in a communication system, the ACU device includes a processor, a memory, a transceiver, and an infrared sensor and is electrically connected to a camera in the agricultural machine. The method includes detecting an obstacle or person within a predetermined distance from the PTO by at least one of the infrared sensor and the camera while the agricultural machine performs autonomous driving and the PTO operates determining a probability of occurrence of a potential accident and a predicted severity of the potential accident based on a change in distance from the PTO to the obstacle or person over time determining whether a VCU device electrically connected to a steering device of the agricultural machine is operating normally, whether a PTO control device electrically connected to the PTO is operating normally, and an ECU device electrically connected to a driving device of the agricultural machine is operating normally, determining a suggested operation for at least one of control of the steering device through the VCU device, control of the PTO through the PTO control device, control of the PTO through the PTO control device, and control of the driving device through the ECU device based on the probability of occurrence of the potential accident and the predicted severity of the potential accident, determining one operation direction of proactive measure post-report or proactive report post-measure based on the probability of occurrence of the potential accident and the predicted severity of the potential accident, when the proactive measure post-report is determined to be the operation direction, performing one of the one or more suggested operations and transmitting information on the probability of occurrence of the potential accident, the predicted severity of the potential accident, and a fact of performance of the one of the one or more suggested operations to a user terminal through the transceiver, and when the proactive report post-measure is determined based on the operation direction, transmitting information on the probability of occurrence of the potential accident, the predicted severity of the potential accident, and the one or more suggested operations to the user terminal, when instruction information for one of the one or more suggested operations is received from the user terminal within a predetermined time, performing one operation according to the instruction information, and when the instruction information for one of the one or more suggested operations is not received from the user terminal within the predetermined time, performing one of the one or more suggested operations and transmitting the information on the probability of occurrence of the potential accident, the predicted severity of the potential accident, and the fact of performance of the one of the one or more suggested operations to the user terminal through the transceiver.

It may be determined whether the VCU device operates normally, whether the PTO control device operates normally, and whether the ECU device operates normally by transmitting a normal operation confirmation request signal from the ACU device to the VCU device, the PTO control device, and the ECU device, respectively, and then receiving, by the ACU device, a normal operation confirmation signal from each of the VCU device, the PTO control device, and the ECU device. In addition, in some embodiment, the probability of occurrence of the potential accident may be determined to be a probability of collision between the PTO and the obstacle or person based on the change in distance from the PTO to the obstacle or person over time, and the predicted severity of the potential accident may be determined based on a predicted impact amount when the PTO collides with the obstacle or person based on a change in relative speed of the PTO with respect to the obstacle or person over time. In addition, in some embodiments, a method of operating an ACU device electrically connected to an agricultural machine including a PTO in a communication system, the ACU device may include a processor, a memory, a transceiver, and an infrared sensor and may be electrically connected to a camera in the agricultural machine.

In addition, the processor may be configured to perform the method of operating an ACU device electrically connected to an agricultural machine including a PTO in the communication system according to the above-described embodiments. In addition, in some embodiments, a computer program may be configured to perform a method of operating an ACU device electrically connected to an agricultural machine including a PTO in the communication system, and may be recorded in a computer-readable storage medium.

According to various embodiments of the present disclosure, there is a provided a method of operating an ACU device electrically connected to an agricultural machine including a PTO in a communication system, the ACU device including a processor, a memory, a transceiver, and an infrared sensor and being electrically connected to a camera in the agricultural machine, the operation method comprising detecting an obstacle or person within a predetermined distance from the PTO by at least one of the infrared sensor and the camera while the agricultural machine performs autonomous driving and the PTO operates, determining a probability of occurrence of a potential accident and a predicted severity of the potential accident based on a change in distance from the PTO to the obstacle or person over time, determining whether a VCU device electrically connected to a steering device of the agricultural machine is operating normally, whether a PTO control device electrically connected to the PTO is operating normally, and an ECU device electrically connected to a driving device of the agricultural machine is operating normally, determining an operation to avoid an accident by one of control of the steering device through the VCU device, control of the PTO through the PTO control device, control of the PTO through the PTO control device, and control of the driving device through the ECU device based on the probability of occurrence of the potential accident and the predicted severity of the potential accident; and performing the determined operation to avoid an accident.

According to various embodiments of the present disclosure, there is provided an ACU device electrically connected to an agricultural machine including a PTO in a communication system, in which the ACU device may include a processor, a memory, and an infrared sensor and may be electrically connected to a camera in the agricultural machine, and the processor may be configured to perform the method of operating an ACU device according to various embodiments of the present disclosure.

According to various embodiments of the present disclosure, there is provided a computer program configured to perform a method of operating an ACU device according to various embodiments of the present disclosure and recorded on a computer-readable storage medium.

According to various embodiments of the present disclosure, it is possible to provide a device for controlling a driving unit according to a position of a shuttle lever of an agricultural machine that supports autonomous driving.

According to various embodiments of the present disclosure, by creating a new definition of a position between forward and neutral or between neutral and rearward for a shuttle lever having a forward-neutral-rearward structure of an agricultural machine, it is possible to provide a device for providing a conversion between autonomous and manual driving.

According to various embodiments of the present disclosure, it is possible to provide a device capable of organizing a control direction of a driving unit in connection with a position of a shuttle lever in an autonomous driving state of an agricultural machine.

According to various embodiments of the present disclosure, it is possible to provide a device capable of controlling a conversion between manual and autonomous driving of an agricultural machine using a shuttle lever.

Effects which can be achieved by the present disclosure are not limited to the above-described effects. That is, other objects that are not described may be obviously understood by those skilled in the art to which the present disclosure pertains from the following description.

DETAILED DESCRIPTION OF EXEMPLARY EMBODIMENTS

Terms used in the present disclosure may be used only in order to describe specific exemplary embodiments rather than restricting the scope of other exemplary embodiments. Singular forms may include plural forms unless the context clearly indicates otherwise. Terms used in the present specification including technical and scientific terms have the same meanings as those that are generally understood by those skilled in the art to which the present disclosure pertains. Terms defined in a general dictionary among terms used in the present disclosure may be interpreted as meanings that are the same as or similar to meanings within a context of the related art, and are not interpreted as ideal or excessively formal meanings unless clearly defined in the present disclosure. In some cases, terms may not be interpreted to exclude exemplary embodiments of the present disclosure even though they are defined herein.

Figure 1:
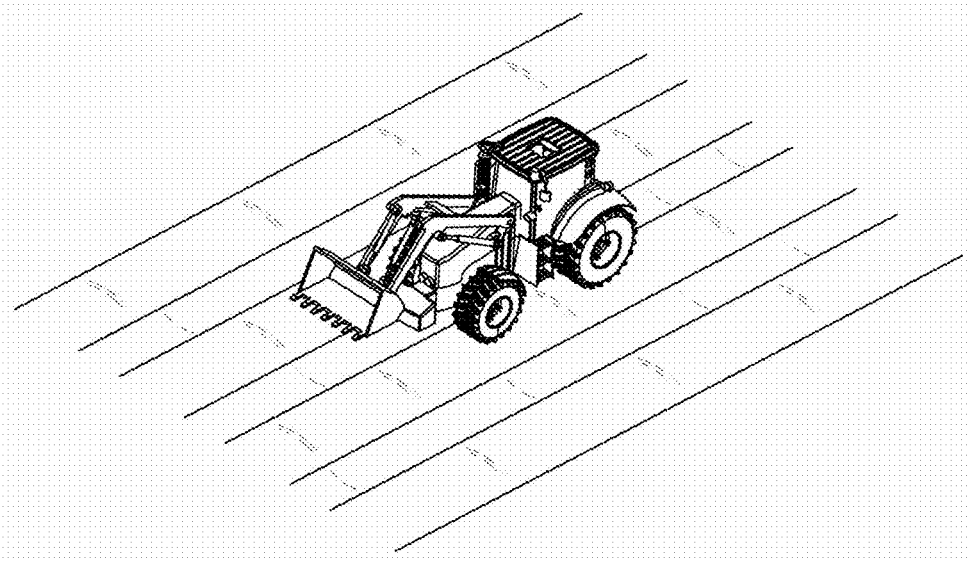
FIG. 1 is a diagram illustrating an example of autonomous driving of an agricultural machine according to various embodiments of the present disclosure.

FIG. 1 is a diagram illustrating an example of autonomous driving of an agricultural machine according to various embodiments of the present disclosure.

Agricultural machines are treated as a very important element to reduce high labor burden and production costs in response to labor shortages due to the decline and aging of working population in rural areas. The agricultural machines perform various tasks necessary for farming, and are capable of performing various types of work such as plowing, rotary work, pest control, and transplanting work, and are classified into walk-behind work machines that workers operate while walking along with the agricultural machines and riding-type work machines where workers sit in driver's seats provided on the agricultural machines and operates the agricultural machines.

Various embodiments of the present disclosure disclose devices applicable to agricultural machines, which are classified as riding work machines such as a tractor.

Driving an agricultural machine on agricultural land such as a rice paddy or field involves work.

A user of the agricultural machine may directly perform manual driving control. The user of the agricultural machine may control the forward or rearward movement of the agricultural machine by directly operating a shuttle lever of the agricultural machine, and control a path of the agricultural machine by operating a steering wheel.

For the autonomous driving of the agricultural machine, a driving control device to control forward or rearward driving may be installed on the agricultural machine. In this case, the agricultural machine moves along the set path and may move forward or rearward according to what is set by the user of the agricultural machine. The autonomous driving may be controlled through information exchange between the driving control device installed on the agricultural machine and a user device. The user may generate autonomous driving-related setting information using the user device, such as a smartphone or computer, which is a terminal capable of performing information calculations and transmitting and receiving information, and transmit the generated autonomous driving-related setting information to the driving control device. The driving control device includes a transceiver and a processor, and is electrically connected to a driving unit of the agricultural machine to control the driving unit. The driving control device may receive the autonomous driving-related setting information from the user device, and control the forward or rearward movement of the driving unit of the agricultural machine according to the autonomous driving-related setting information.

For the autonomous driving of the agricultural machine, a steering control device to control the steering wheel may additionally be installed on the agricultural machine. In this case, the steering control device may be configured to control the steering wheel so that the agricultural machine may move along the set path according to the autonomous driving-related setting information received from the user device. The steering control device may be mechanically connected to the steering wheel and configured to rotate the steering wheel along the set path. The steering control device may receive the autonomous driving-related setting information from the user device, including the transceiver. The steering control device may perform rotation control of the steering wheel according to the autonomous driving-related setting information, including the processor.

Figure 2:
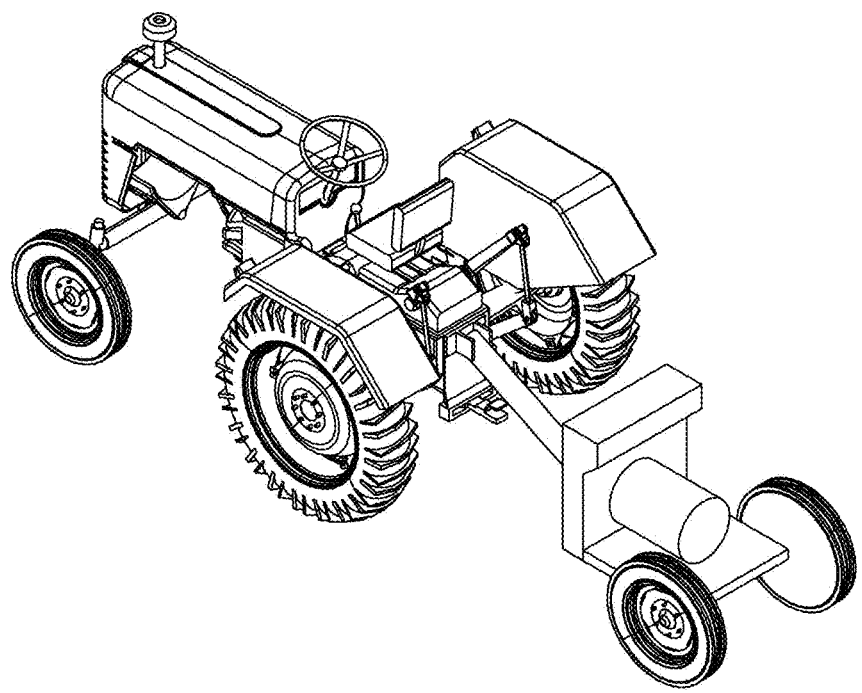
FIG. 2 is a diagram illustrating an example of a power take off (PTO) of an agricultural machine according to various embodiments of the present disclosure.

FIG. 2 is a diagram illustrating an example of a power take off (PTO) of an agricultural machine according to various embodiments of the present disclosure.

The PTO is a device used when rotational force of an engine is used for purposes other than the original purpose of the device. Air compressors, generators, and various other power devices may be connected to the PTO. Power of a ladder truck is also supplied through the PTO. The PTO is usually used in automobiles (agricultural truck and the like) or agricultural machines (cultivator, tractor, etc.), and is also installed on ships. In this case, the PTO is connected to a fire suppression device, a generator, etc.

The PTO increases efficiency by allowing an engine attached to one device to be used for a wide variety of purposes. For example, when agricultural pesticide sprayers do not have the PTO, a model with an engine or a motor should be purchased, which makes it heavy, expensive, and cumbersome to manage. However, by using the PTO attached to the truck or cultivator, it is possible to prepare this at minimal additional cost. In addition to agricultural purpose, the PTO is useful at construction sites, etc., when there are cars (trucks) and multiple power devices are required.

The PTO allows the engine to be used very efficiently for a variety of purposes, but there may be a risk of accident. In particular, when connecting other power devices such as threshers to the outside for agricultural purpose, inattentive accidents may often occur when a person's body or clothes get caught in a power shaft. Due to the enormous torque of the PTO, there is a high possibility of fracture or death in the event of the inattentive accident. For example, in the United States, it is such a serious problem that 6% of tractor fatal accidents are caused by the PTO.

Figure 3:
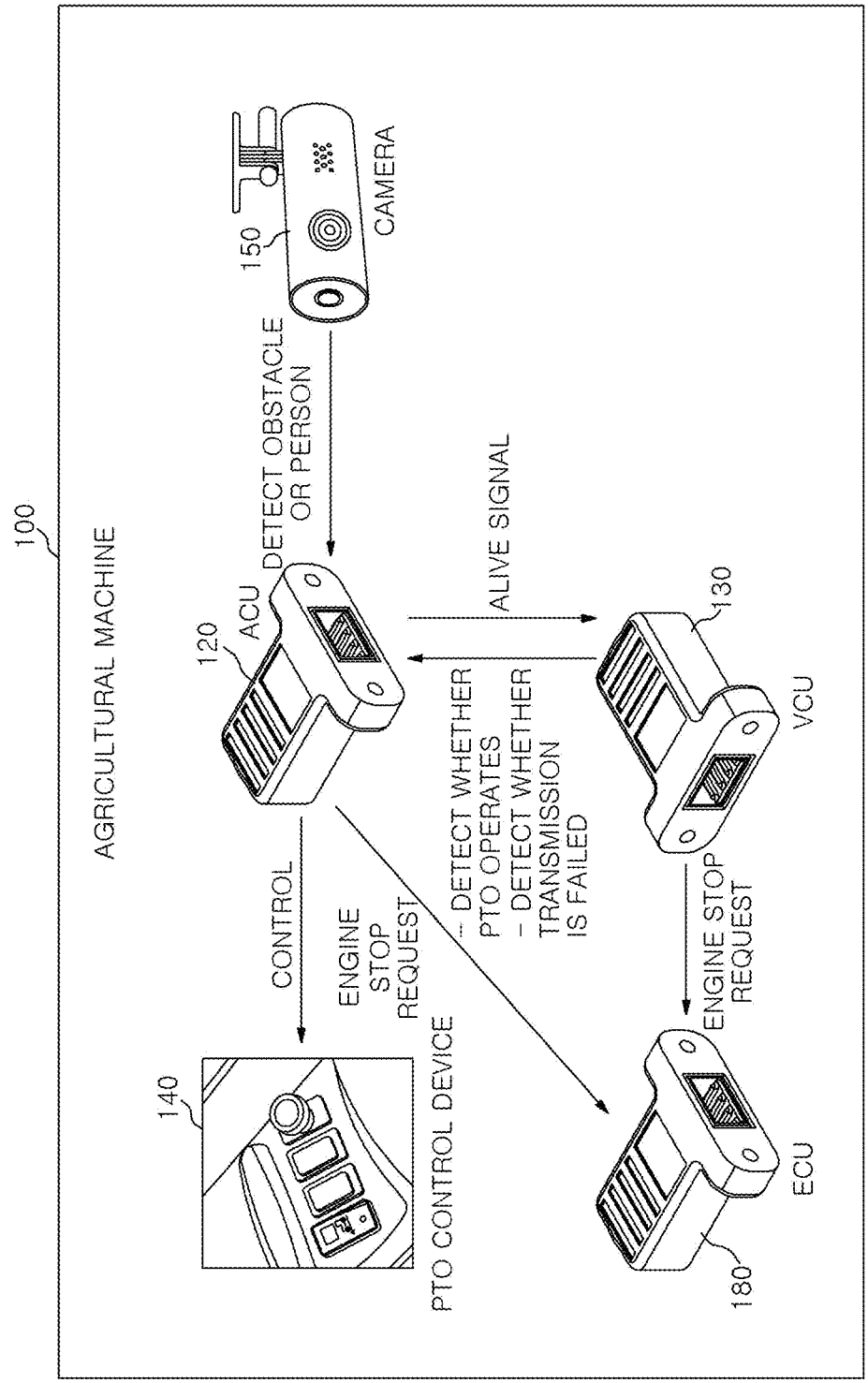
FIG. 3 is a diagram illustrating an example of a configuration of a control device of an agricultural machine according to various embodiments of the present disclosure.

FIG. 3 is a diagram illustrating an example of a configuration of a control device of an agricultural machine according to various embodiments of the present disclosure.

Referring to FIG. 3, the agricultural machine 100 includes an automated-driving control unit (ACU) 120, a vehicle control unit (VCU) 130, a PTO control device 140, a camera 150, and an engine control unit (ECU) 180.

The ACU 120 may be configured to receive information related to autonomous driving of the agricultural machine 100 from a user terminal or a server and control the operation of the agricultural machine 100 in relation to the autonomous driving. The ACU 120 may determine the autonomous driving path of the agricultural machine 100 and determine the driving operation and steering control according to the autonomous driving path of the agricultural machine 100. The ACU 120 may be configured to transmit a control signal to the VCU 130, the PTO control device 140, the camera 150, and the ECU 180 in relation to the autonomous driving of agricultural machine 100, and receive information according to performance of the controlled operations from the VCU 130, the PTO control device 140, the camera 150, and the ECU 180. The ACU 120 may transmit a normal operation confirmation request signal to the VCU 130, the PTO control device 140, and the ECU 180 periodically, or in some cases, aperiodically, in relation to the autonomous driving of the agricultural machine 100, and confirm whether the VCU 130, the PTO control device 140, and the ECU 180 are operating normally by receiving a normal operation confirmation signal from the VCU 130, the PTO control device 140, and the ECU 180.

The VCU 130 may control various electric devices within the agricultural machine 100. The VCU 130 may be configured to control the steering device, the transmission, etc., of the agricultural machine 100 in relation to the autonomous driving of the agricultural machine 100. The VCU 130 may receive signals receives signals for a passenger to control the agricultural machine through various electric devices in the agricultural machine 100 and control the ECU 180 based on the received signals.

The PTO control device 140 may control the PTO to operate or stop. The PTO control device 140 may control the operation of the PTO by connecting or disconnecting power to or from the PTO.

The camera 150 is configured to capture an image of a forward object. The camera 150 may be configured to photograph people or objects around the PTO.

The ECU 180 is electrically connected to the driving device, that is, the engine, of the agricultural machine 100. The ECU 180 may control the driving device of the agricultural machine 100 to operate or stop. The ACU 120 and the VCU 130 may transmit a control signal for driving or stopping the driving device to the ECU 180. When the control signal is transmitted from the ACU 120 to the ECU 180, the control of the driving device is determined according to the autonomous driving without the determination of the passenger, and thus, the control signal is transmitted. When the control signal is transmitted from the VCU 130 to the ECU 180, control of the driving device is determined according to the control of the passenger, and thus, the control signal is transmitted.

Figure 4:
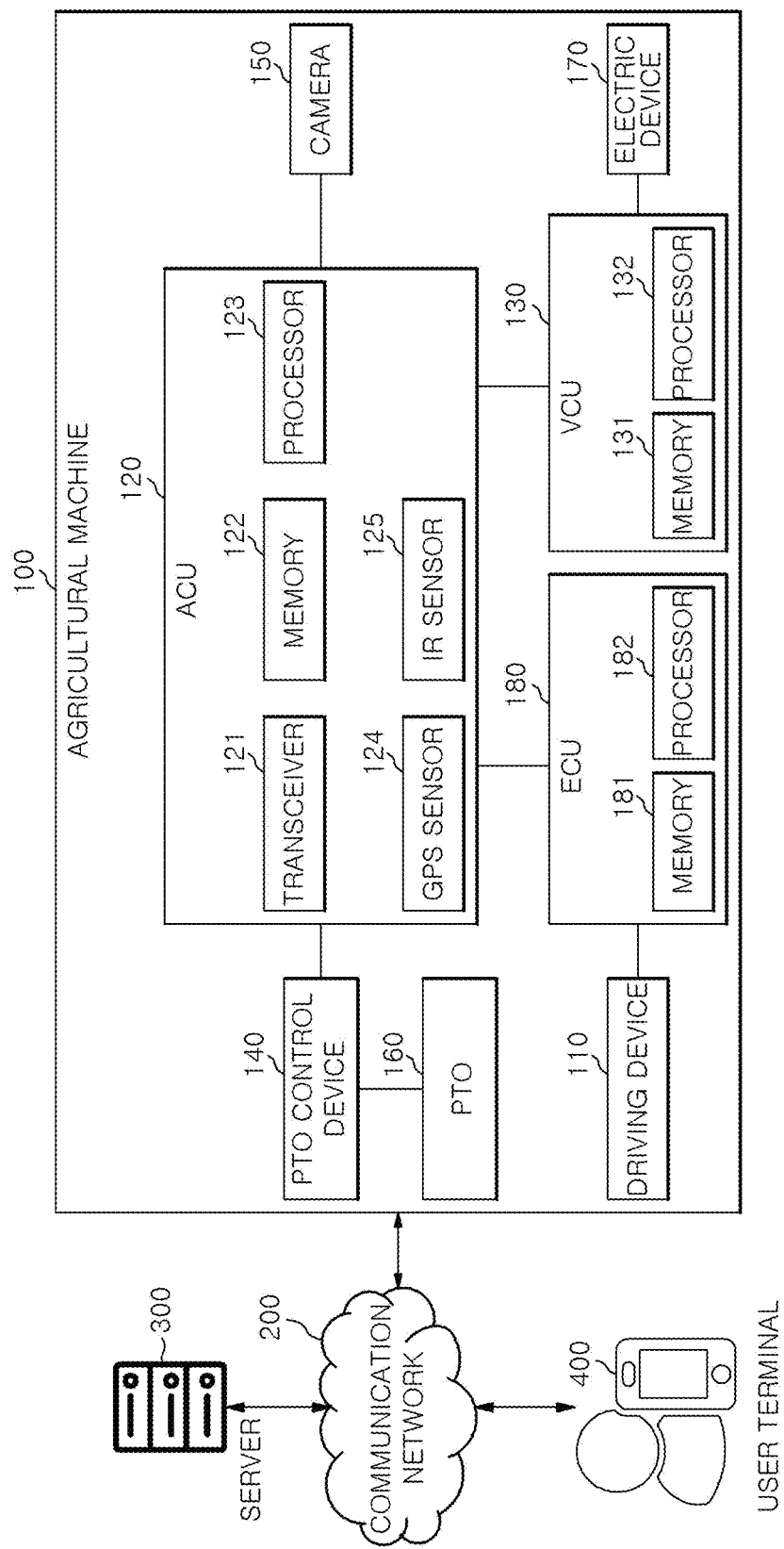
FIG. 4 is a diagram illustrating an example of a configuration of a control device of an agricultural machine according to various embodiments of the present disclosure.

FIG. 4 is a diagram illustrating an example of a configuration of a control device of an agricultural machine according to various embodiments of the present disclosure.

Referring to FIG. 4, the agricultural machine 100 is connected to a server 300 and a user terminal 400 through the communication network 200.

The agricultural machine 100 includes the driving device 110, the ACU 120, the VCU 130, the PTO control device 140, the camera 150, a PTO 160, an electric device 170, and the ECU 180.

The driving device 110 corresponds to the engine of the agricultural machine 100. The driving device 110 may operate or stop under the control of the ECU 180.

The ACU 120 may be configured to receive information related to autonomous driving of the agricultural machine 100 from the user terminal 400 or the server 300 and control the operation of the agricultural machine 100 in relation to the autonomous driving. The ACU 120 includes a transceiver 121, a memory 122, a processor 123, a global positioning system (GPS) sensor 124, and an infrared (IR) sensor 125.

The transceiver 121 is connected to the processor 123 and transmits and/or receives a signal. A portion or entirety of the transceiver 121 may be referred to as a transmitter, a receiver, or a transceiver. The transceiver 121 may support at least one of various wireless communication standards, such as an institute of electrical and electronics engineers (IEEE) 802.xx system, an IEEE Wi-Fi system, $3^{rd}$ generation partnership project (3GPP) system, a 3GPP long term evolution (LTE) system, a 3GPP 5G new radio (NR) system, a 3GPP2 system, and Bluetooth, which are wireless access systems.

The memory 122 may be connected to the transceiver 121 and store information and the like received through communication. In addition, the memory 122 is connected to the processor 123, and may store data such as a default program for an operation of the processor 123, an application program, configuration information, and information generated by a calculation of the processor 123. The memory 122 may be composed of a volatile memory, a non-volatile memory, or a combination of a volatile and a non-volatile memory. Also, the memory 122 may provide stored data according to a request of the processor 123.

The processor 123 may be configured to implement procedures and/or methods proposed in the present disclosure. The processor 123 controls the overall operation of the ACU 120. For example, the processor 123 transmits or receives information or the like through the transceiver 121. In addition, the processor 123 writes and reads data in and from the memory 122. The processor 123 may include at least one processor.

The GPS sensor 124 is configured to determine the GPS position of the agricultural machine 100. The GPS sensor 124 receives signals transmitted from three or more GPS satellites to determine the positions of the satellites and the GPS sensor 124. By measuring a time difference between the signal transmitted from the GPS satellite and the signal received from the GPS sensor 124, a distance between the GPS satellite and the GPS sensor 124 may be obtained. In this case, the signal transmitted from the GPS satellite includes the information on the position of the GPS satellite. Once the distances from at least three GPS satellites and the positions of each GPS satellite are determined, the position of the GPS sensor may be calculated using methods such as trilateration. The GPS position of the agricultural machine 100 may be determined using the GPS sensor 124.

The IR sensor 125 is a sensor that uses infrared rays and generates external free charges by changing a polarization of a material with spontaneous polarization within the sensor using infrared rays emitted from an external material to detect external substances. The IR sensor 125 may be configured to detect people or other obstacles around the PTO.

The VCU 130 may control various electric devices 170 within the agricultural machine 100. The VCU 130 includes a memory 131 and a processor 132.

The memory 131 is connected to the processor 132 and may store data such as a default program for an operation of the processor 132, an application program, configuration information, and information generated by a calculation of the processor 132. The memory 131 may be composed of a volatile memory, a non-volatile memory, or a combination of a volatile and a non-volatile memory. Also, the memory 131 may provide stored data according to a request of the processor 132.

The processor 132 controls the overall operations of the VCU 130. For example, the processor 132 generates control signals and writes and reads data to and from the memory 131. The processor 132 may include at least one processor.

The PTO control device 140 may control the PTO to operate or stop. The PTO control device 140 may control the operation of the PTO 160 by connecting or disconnecting power to or from the PTO 160.

The camera 150 is configured to capture an image of a forward object. The camera 150 may be configured to photograph people or objects around the PTO 160.

The PTO 160 is a device for transmitting the rotational force of the driving device 110, that is, the engine, in the agricultural machine 100 to other work devices of the driving device 110. There are various types of work devices that can be connected to the PTO 160.

The electric device 170 includes various devices including electronic components within the agricultural machine 100. The electric device 170 may be configured to control the steering device, the transmission, etc., of the agricultural machine 100. The electric device 170 may be configured to receive control input for the agricultural machine 100 from a passenger within the agricultural machine 100.

The ECU 180 is electrically connected to the driving device 110, that is, the engine, of the agricultural machine 100. The ECU 180 may control the driving device 110 of the agricultural machine 100 to operate or stop. The ECU 180 includes a memory 181 and a processor 182.

The memory 181 is connected to the processor 182 and may store data such as a default program for an operation of the processor 182, an application program, configuration information, and information generated by a calculation of the processor 182. The memory 181 may be composed of a volatile memory, a non-volatile memory, or a combination of a volatile and a non-volatile memory. Also, the memory 181 may provide stored data according to a request of the processor 182.

The processor 182 controls the overall operations of the ECU 180. For example, the processor 182 generates control signals and writes and reads data to and from the memory 181. The processor 182 may include at least one processor.

The communication network 200 provides a communication path through which the agricultural machine 100, the server 300, and the user terminal 400 may transmit and receive signals and data to and from each other. The communication network 200 is not limited to a communication method according to a specific communication protocol, and an appropriate communication method may be used according to an implementation example. For example, when configured as an Internet Protocol (IP)-based system, the communication network 200 may be implemented as a wired and wireless Internet network, and when the agricultural machine 100, the server, and the user terminal 400 are implemented as mobile communication terminals, the wired/wireless communication network 200 may be implemented as a wireless network such as a cellular network or a wireless local area network (WLAN) network.

The server 300 is a server operated by manufacturers of the agricultural machine 100 or autonomous driving-based service providers. The server 300 is an electronic device that may transmit autonomous driving-related information of the agricultural machine 100 to the agricultural machine 100 and the user terminal 400 through the communication network 200, and receive information through the communication network 200 from the agricultural machine 100 and the user terminal 400.

The user terminal 400 is a terminal operated by the user of the agricultural machine 100. The user terminal 400 is an electronic device that may transmit and receive information to and from the agricultural machine 100 and the server 300 through the communication network 200.

Figure 5:
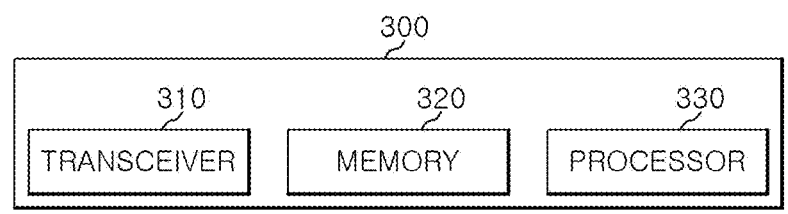
FIG. 5 is a diagram illustrating a configuration of a server according to various embodiments of the present disclosure.

FIG. 5 is a diagram illustrating a configuration of a server according to various embodiments of the present disclosure.

Referring to FIG. 5, the server 300 according to various embodiments of the present disclosure includes a transceiver 310, a memory 320, and a processor 330.

The transceiver 310 is connected to the processor 330 and transmits and/or receives a signal. A portion or entirety of the transceiver 310 may be referred to as a transmitter, a receiver, or a transceiver. The transceiver 310 may support at least one of various wireless communication standards, such as an IEEE 802.xx system, an IEEE Wi-Fi system, a 3GPP system, a 3GPP LTE system, a 3GPP 5G NR system, a 3GPP2 system, and Bluetooth, which are wired access systems and wireless access systems.

The memory 320 may be connected to the transceiver 310 and store information and the like received through communication with the transceiver 310. In addition, the memory 320 is connected to the processor 330 and may store data such as a default program for an operation of the processor 330, an application program, configuration information, and information generated by a calculation of the processor 330. The memory 320 may be composed of a volatile memory, a non-volatile memory, or a combination of a volatile and a non-volatile memory. Also, the memory 320 may provide stored data according to a request of the processor 330.

The processor 330 may be configured to implement procedures and/or methods proposed in the present disclosure. The processor 330 controls the overall operations of the server 300. For example, the processor 330 transmits or receives information or the like through the transceiver 310. In addition, the processor 330 writes and reads data in and from the memory 320. The processor 330 may include at least one processor.

Figure 6:
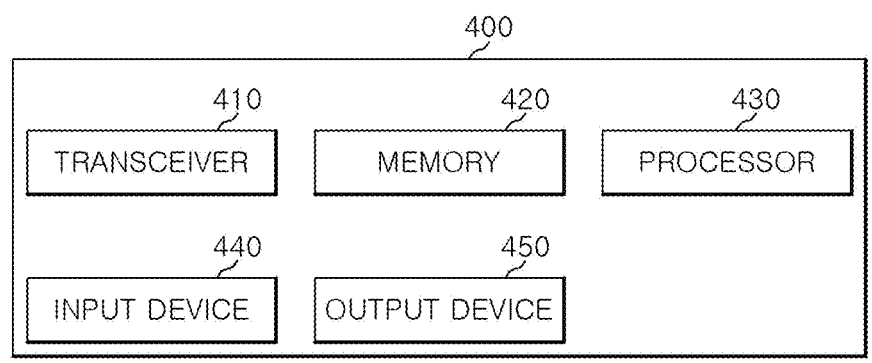
FIG. 6 is a diagram illustrating a configuration of a user terminal according to various embodiments of the present disclosure.

FIG. 6 is a diagram illustrating a configuration of a user terminal according to various embodiments of the present disclosure.

Referring to FIG. 6, the user terminal 400 according to various embodiments of the present disclosure includes a transceiver 410, a memory 420, a processor 430, an input device 440, and an output device 450.

The transceiver 410 is connected to the processor 430 and transmits and/or receives a signal. A portion or entirety of the transceiver 410 may be referred to as a transmitter, a receiver, or a transceiver. The transceiver 410 may support at least one of various wireless communication standards, such as an IEEE 802.xx system, an IEEE Wi-Fi system, a 3GPP system, a 3GPP LTE system, a 3GPP 5G NR system, a 3GPP2 system, and Bluetooth, which are wired access systems and wireless access systems.

The memory 420 may be connected to the transceiver 410, the memory 420, the processor 430, the input device 440, and the output device 450 and may store the information input through the input device 440, the information received through communication between the transceiver 410, etc. In addition, the memory 420 may store information on images captured by the camera 406 or the like. In addition, the memory 420 is connected to the processor 430 and may store data such as a default program for an operation of the processor 430, an application program, configuration information, and information generated by a calculation of the processor 430. The memory 420 may be composed of a volatile memory, a non-volatile memory, or a combination of a volatile and a non-volatile memory. Also, the memory 420 may provide stored data according to a request of the processor 430.

The processor 430 may be configured to implement procedures and/or methods proposed in the present disclosure. The processor 430 controls the overall operations of the user terminal 400. For example, the processor 430 transmits or receives information or the like through the transceiver 410. In addition, the processor 430 writes and reads data in and from the memory 420. In addition, the processor 430 receives information through the input device 440. In addition, the processor 430 outputs the information through the output device 450. In addition, the processor 430 photographs images through the camera 406. The processor 430 may include at least one processor.

The input device 440 is connected to the processor 430 and may input information, etc. According to an embodiment, the input device 440 may input information or the like received from another device connected to the wired/wireless communication network through the transceiver 410. The input device 440 may include a touch display, a keypad, a keyboard, etc.

The output device 450 is connected to the processor 430 and may output information or the like in the form of video/audio or the like. According to an embodiment, the output device 450 may output information or the like received from another device connected to the wired/wireless communication network through the transceiver 410. The output device 450 may include a display, a speaker, etc.

The control device of the above-described agricultural machine may perform a method of operating an ACU device electrically connected to an agricultural machine including a PTO in the communication system or a method of operating an ACU device electrically connected to an agricultural machine including the PTO.

Figure 7:
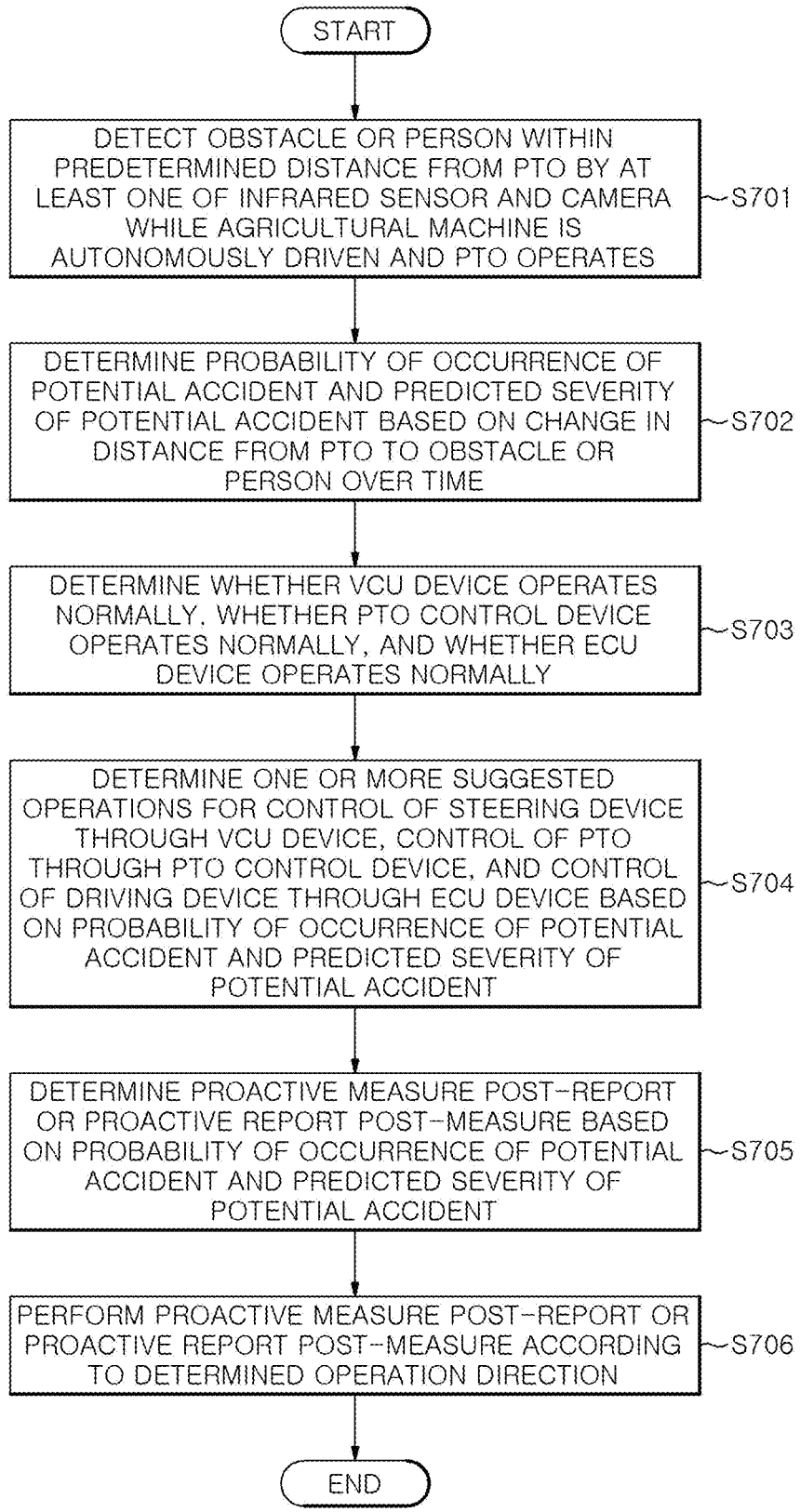
FIG. 7 illustrates a process of operating an automated-driving control unit (ACU) device according to various embodiments of the present disclosure.

Method of Operating ACU Device Electrically Connected to Agricultural Machine Including PTO in Communication System FIG. 7 is a diagram illustrating a process of operating an ACU device according to various embodiments of the present disclosure. In the embodiment of FIG. 7, the ACU device is electrically connected to the agricultural machine including the PTO. The ACU device includes the processor, the memory, the transceiver, and the infrared sensor. The ACU device is electrically connected to the camera in the agricultural machine.

Referring to FIG. 7, in operation S701, an obstacle or person within a predetermined distance from the PTO is detected by at least one of the infrared sensor and the camera while the agricultural machine performs the autonomous driving and the PTO operates.

In operation S702, a probability of occurrence of a potential accident and a predicted severity of the potential accident is determined based on the change in distance from the PTO to the obstacle or person over time.

In operation S703, it is determined whether a vehicle control unit (VCU) device electrically connected to a steering device of the agricultural machine is operating normally, whether a PTO control device electrically connected to the PTO is operating normally, and an engine control unit (ECU) device electrically connected to a driving device of the agricultural machine is operating normally.

In operation S704, a suggested operation for at least one of the control of the steering device through the VCU device, control of the PTO through the PTO control device, the control of the PTO through the PTO control device, and the control of the driving device through the ECU device is determined based on the probability of occurrence of the potential accident and the predicted severity of the potential accident.

In operation S705, one operation direction of proactive measure post-report or proactive report post-measure is determined based on the probability of occurrence of the potential accident and the predicted severity of the potential accident.

In operation S706, the ACU device performs the proactive measure post-report or the proactive report post-measure according to the determined operation direction.

When the proactive measure post-report is determined based on the operation direction, the ACU device performs one of the one or more suggested operations and transmits information on the probability of occurrence of the potential accident, the predicted severity of the potential accident, and a fact of performance of the one of the one or more suggested operations to a user terminal through the transceiver.

When the proactive report post-measure is determined based on the operation direction, the ACU device transmits the information on the probability of occurrence of the potential accident, the predicted severity of the potential accident, and the one or more suggested operations to the user terminal, when instruction information for one of the one or more suggested operations is received from the user terminal within a predetermined time, the ACU device performs one operation according to the instruction information. When the instruction information for one of the one or more suggested operations is not received from the user terminal within the predetermined time, the ACU device performs one of the one or more suggested operations and transmits the information on the probability of occurrence of the potential accident, the predicted severity of the potential accident, and the fact of performance of the one of the one or more suggested operations to the user terminal through the transceiver.

According to various embodiment of the present disclosure, the control of the steering device through the VCU device may include the steering control of the agricultural machine in a direction to avoid the potential accident. The control of the PTO through the PTO control device may include the driving stop control of the PTO. The control of the driving device through the ECU device may include driving stop control of the agricultural machine.

According to various embodiment of the present disclosure, the probability of occurrence of the potential accident may be determined to be a probability of collision between the PTO and the obstacle or person based on the change in distance from the PTO to the obstacle or person over time. The predicted severity of the potential accident may be determined based on a predicted impact amount when the PTO collides with the obstacle or person based on a change in relative speed of the PTO with respect to the obstacle or person over time.

The operation of determining the one or more suggested operations may be performed when the probability of occurrence of the potential accident is greater than or equal to the threshold probability. When the probability of occurrence of the potential accident is greater than or equal to the threshold probability, the ACU 120 determines one or more suggested operations to be provided to the user in preparation for a case in which the potential accident turns into an actual accident. Here, the contents of the suggested operation are determined based on the predicted severity.

According to various embodiment of the present disclosure, the determining of the one or more suggested operations may be performed when the probability of occurrence of the potential accident is greater than or equal to the threshold probability. The determining of the one or more suggested operations may include: when the predicted severity is greater than or equal to the first critical severity and less than the second critical severity, determining the one or more suggested operations for control of the steering device, control of the PTO, and control of the driving device. The determining of the one or more suggested operations may include: when the predicted severity is greater than or equal to the second critical severity and less than the third critical severity, determining the one or more suggested operations for control of the PTO and control of the driving device. The determining of the one or more suggested operations may include: when the predicted severity is greater than or equal to the third critical severity, determining the one or more suggested operations for control of the driving device. The third critical severity may be greater than the second critical severity and the first critical severity, and the first critical severity may be lower than the third critical severity and the second critical severity.

According to various embodiments of the present disclosure, the determining of the one or more suggested operations may include: when the predicted severity is greater than or equal to the first critical severity and less than the second critical severity, and the VCU operates normally, determining the one or more suggested operations for control of the steering device through the PTO control device and control of the PTO through the PTO control device. The determining of the one or more suggested operations may include: when the predicted severity is greater than or equal to the first critical severity and less than the second critical severity, the VCU does not operate normally, and the PTO control device operates normally, determining the one or more suggested operations for control of the PTO through the PTO control device. The determining of the one or more suggested operations may include: when the predicted severity is greater than or equal to the first critical severity and less than the second critical severity, the VCU and the PTO control device do not operate normally, and the ECU device operates normally, determining the operation to avoid an accident under the control of the driving device through the ECU device.

According to various embodiments of the present disclosure, the determining of the one or more suggested operations may include: when the predicted severity is greater than or equal to the second critical severity and less than the third critical severity, and the PTO control device operates normally, determining the one or more suggested operations for control of the PTO through the PTO control device and control of the driving device through the ECU device. The determining of the one or more suggested operations may include: when the predicted severity is greater than or equal to the second critical severity and less than the third critical severity, the PTO control device do not operate normally, and the ECU device operates normally, determining the one or more suggested operations for control of the driving device through the ECU device.

According to various embodiments of the present disclosure, when the proactive measure post-report is determined to be the operation direction, or when the proactive report post-measure is determined in the operation direction and the instruction information for one of the one or more suggested operations is not received from the user terminal within the predetermined time: The performing of one of the one or more suggested operations may include performing an operation with the highest priority among the one or more suggested operations. Priorities are in the order of the control of the steering device through the VCU device, the control of the PTO through the PTO control device, and the control of the driving device through the ECU device. The control of the steering device through the VCU device has the highest priority, and the control of the driving device through the ECU device has the lowest priority.

According to various embodiments of the present disclosure, it may be determined whether the VCU device operates normally, whether the PTO control device operates normally, and whether the ECU device operates normally by transmitting a normal operation confirmation request signal from the ACU device to the VCU device, the PTO control device, and the ECU device, respectively, and then receiving, by the ACU device, a normal operation confirmation signal from each of the VCU device, the PTO control device, and the ECU device.

According to various embodiments, in the method of operating an ACU device electrically connected to an agricultural machine including a PTO in a communication system, the ACU device includes the processor, the memory, the transceiver, and the infrared sensor and is electrically connected to the camera in the agricultural machine. The method includes: detecting an obstacle or person within a predetermined distance from the PTO by at least one of the infrared sensor and the camera while the agricultural machine performs autonomous driving and the PTO operates; determining a probability of occurrence of a potential accident and a predicted severity of the potential accident based on the change in distance from the PTO to the obstacle or person over time; determining whether a VCU device electrically connected to a steering device of the agricultural machine is operating normally, whether a PTO control device electrically connected to the PTO is operating normally, and an ECU device electrically connected to a driving device of the agricultural machine is operating normally; determining a suggested operation for at least one of control of the steering device through the VCU device, control of the PTO through the PTO control device, control of the PTO through the PTO control device, and control of the driving device through the ECU device based on the probability of occurrence of the potential accident and the predicted severity of the potential accident; determining one operation direction of proactive measure post-report or proactive report post-measure based on the probability of occurrence of the potential accident and the predicted severity of the potential accident; when the proactive measure post-report is determined to be the operation direction, performing one of the one or more suggested operations and transmitting information on the probability of occurrence of the potential accident, the predicted severity of the potential accident, and a fact of performance of the one of the one or more suggested operations to a user terminal through the transceiver; and when the proactive report post-measure is determined based on the operation direction, transmitting information on the probability of occurrence of the potential accident, the predicted severity of the potential accident, and the one or more suggested operations to the user terminal, when instruction information for one of the one or more suggested operations is received from the user terminal within a predetermined time, performing one operation according to the instruction information, and when the instruction information for one of the one or more suggested operations is not received from the user terminal within the predetermined time, performing one of the one or more suggested operations and transmitting the information on the probability of occurrence of the potential accident, the predicted severity of the potential accident, and the fact of performance of the one of the one or more suggested operations to the user terminal through the transceiver. Here, the control of the steering device through the VCU device may include steering control of the agricultural machine in a direction to avoid the potential accident. The control of the PTO through the PTO control device may include the driving stop control of the PTO. The control of the driving device through the ECU device may include driving stop control of the agricultural machine. In addition, in some embodiments, the probability of occurrence of the potential accident may be determined to be a probability of collision between the PTO and the obstacle or person based on the change in distance from the PTO to the obstacle or person over time. The predicted severity of the potential accident may be determined based on a predicted impact amount when the PTO collides with the obstacle or person based on a change in relative speed of the PTO with respect to the obstacle or person over time.

According to various embodiments, in the method of operating an ACU device electrically connected to an agricultural machine including a PTO in a communication system, the ACU device includes the processor, the memory, the transceiver, and the infrared sensor and is electrically connected to the camera in the agricultural machine. The method includes: detecting an obstacle or person within a predetermined distance from the PTO by at least one of the infrared sensor and the camera while the agricultural machine performs autonomous driving and the PTO operates; determining a probability of occurrence of a potential accident and a predicted severity of the potential accident based on the change in distance from the PTO to the obstacle or person over time; determining whether a VCU device electrically connected to a steering device of the agricultural machine is operating normally, whether a PTO control device electrically connected to the PTO is operating normally, and an ECU device electrically connected to a driving device of the agricultural machine is operating normally; determining a suggested operation for at least one of control of the steering device through the VCU device, control of the PTO through the PTO control device, control of the PTO through the PTO control device, and control of the driving device through the ECU device based on the probability of occurrence of the potential accident and the predicted severity of the potential accident; determining one operation direction of proactive measure post-report or proactive report post-measure based on the probability of occurrence of the potential accident and the predicted severity of the potential accident; when the proactive measure post-report is determined to be the operation direction, performing one of the one or more suggested operations and transmitting information on the probability of occurrence of the potential accident, the predicted severity of the potential accident, and a fact of performance of the one of the one or more suggested operations to a user terminal through the transceiver; and when the proactive report post-measure is determined based on the operation direction, transmitting information on the probability of occurrence of the potential accident, the predicted severity of the potential accident, and the one or more suggested operations to the user terminal, when instruction information for one of the one or more suggested operations is received from the user terminal within a predetermined time, performing one operation according to the instruction information, and when the instruction information for one of the one or more suggested operations is not received from the user terminal within the predetermined time, performing one of the one or more suggested operations and transmitting the information on the probability of occurrence of the potential accident, the predicted severity of the potential accident, and the fact of performance of the one of the one or more suggested operations to the user terminal through the transceiver. The determining of the one or more suggested operations may be performed when the probability of occurrence of the potential accident is greater than or equal to the threshold probability, and the determining of the one or more suggested operations may include: when the predicted severity is greater than or equal to a first critical severity and less than a second critical severity, determining the one or more suggested operations for control of the steering device, control of the PTO, and control of the driving device, when the predicted severity is greater than or equal to the second critical severity and less than the third critical severity, determining the one or more suggested operations for control of the PTO and control of the driving device, and when the predicted severity is greater than or equal to a third critical severity, determining the one or more suggested operations for control of the driving device. The third critical severity may be greater than the second critical severity and the first critical severity, and the first critical severity may be lower than the third critical severity and the second critical severity. In addition, in some embodiments, the determining of the one or more suggested operations may include: when the predicted severity is greater than or equal to the first critical severity and less than the second critical severity, determining the one or more suggested operations for control of the steering device through the VCU device and control of the PTO through the PTO control device when the VCU operates normally, determining the one or more suggested operations for control of the PTO through the PTO control device when the VCU does not operate normally and the PTO control device operates normally, and determining the one or more suggested operations for control of the driving device through the ECU device when the VCU and the PTO control device do not operate normally and the ECU device operates normally. In addition, in some embodiments, the determining of the one or more suggested operations may include: when the predicted severity is greater than or equal to the second critical severity and less than the third critical severity, determining the one or more suggested operations for control of the PTO through the PTO control device and control of the driving device through the ECU device when the PTO control device operates normally, and determining the one or more suggested operations for control of the driving device through the ECU device when the PTO control device does not operate normally and the ECU device operates normally.

According to various embodiments, in the method of operating an ACU device electrically connected to an agricultural machine including a PTO in a communication system, the ACU device includes the processor, the memory, the transceiver, and the infrared sensor and is electrically connected to the camera in the agricultural machine. The method includes: detecting an obstacle or person within a predetermined distance from the PTO by at least one of the infrared sensor and the camera while the agricultural machine performs autonomous driving and the PTO operates; determining a probability of occurrence of a potential accident and a predicted severity of the potential accident based on the change in distance from the PTO to the obstacle or person over time; determining whether a VCU device electrically connected to a steering device of the agricultural machine is operating normally, whether a PTO control device electrically connected to the PTO is operating normally, and an ECU device electrically connected to a driving device of the agricultural machine is operating normally; determining a suggested operation for at least one of control of the steering device through the VCU device, control of the PTO through the PTO control device, control of the PTO through the PTO control device, and control of the driving device through the ECU device based on the probability of occurrence of the potential accident and the predicted severity of the potential accident; determining one operation direction of proactive measure post-report or proactive report post-measure based on the probability of occurrence of the potential accident and the predicted severity of the potential accident; when the proactive measure post-report is determined to be the operation direction, performing one of the one or more suggested operations and transmitting information on the probability of occurrence of the potential accident, the predicted severity of the potential accident, and a fact of performance of the one of the one or more suggested operations to a user terminal through the transceiver; and when the proactive report post-measure is determined based on the operation direction, transmitting information on the probability of occurrence of the potential accident, the predicted severity of the potential accident, and the one or more suggested operations to the user terminal, when instruction information for one of the one or more suggested operations is received from the user terminal within a predetermined time, performing one operation according to the instruction information, and when the instruction information for one of the one or more suggested operations is not received from the user terminal within the predetermined time, performing one of the one or more suggested operations and transmitting the information on the probability of occurrence of the potential accident, the predicted severity of the potential accident, and the fact of performance of the one of the one or more suggested operations to the user terminal through the transceiver. When the proactive measure post-report is determined to be the operation direction, or when the proactive report post-measure is determined in the operation direction and the instruction information for one of the one or more suggested operations is not received from the user terminal within the predetermined time, the performing of one of the one or more suggested operations may include performing an operation with a highest priority among the one or more suggested operations. Priorities may be in the order of the control of the steering device through the VCU device, the control of the PTO through the PTO control device, and the control of the driving device through the ECU device, the priority of the control of the steering device through the VCU device may be highest, and the priority of the control of the driving device through the ECU device may be lowest. In addition, in some embodiment, the probability of occurrence of the potential accident may be determined to be a probability of collision between the PTO and the obstacle or person based on the change in distance from the PTO to the obstacle or person over time, and the predicted severity of the potential accident may be determined based on a predicted impact amount when the PTO collides with the obstacle or person based on a change in relative speed of the PTO with respect to the obstacle or person over time.

According to various embodiments, in the method of operating an ACU device electrically connected to an agricultural machine including a PTO in a communication system, the ACU device includes the processor, the memory, the transceiver, and the infrared sensor and is electrically connected to the camera in the agricultural machine. The method includes: detecting an obstacle or person within a predetermined distance from the PTO by at least one of the infrared sensor and the camera while the agricultural machine performs autonomous driving and the PTO operates; determining a probability of occurrence of a potential accident and a predicted severity of the potential accident based on the change in distance from the PTO to the obstacle or person over time; determining whether a VCU device electrically connected to a steering device of the agricultural machine is operating normally, whether a PTO control device electrically connected to the PTO is operating normally, and an ECU device electrically connected to a driving device of the agricultural machine is operating normally; determining a suggested operation for at least one of control of the steering device through the VCU device, control of the PTO through the PTO control device, control of the PTO through the PTO control device, and control of the driving device through the ECU device based on the probability of occurrence of the potential accident and the predicted severity of the potential accident; determining one operation direction of proactive measure post-report or proactive report post-measure based on the probability of occurrence of the potential accident and the predicted severity of the potential accident; when the proactive measure post-report is determined to be the operation direction, performing one of the one or more suggested operations and transmitting information on the probability of occurrence of the potential accident, the predicted severity of the potential accident, and a fact of performance of the one of the one or more suggested operations to a user terminal through the transceiver; and when the proactive report post-measure is determined based on the operation direction, transmitting information on the probability of occurrence of the potential accident, the predicted severity of the potential accident, and the one or more suggested operations to the user terminal, when instruction information for one of the one or more suggested operations is received from the user terminal within a predetermined time, performing one operation according to the instruction information, and when the instruction information for one of the one or more suggested operations is not received from the user terminal within the predetermined time, performing one of the one or more suggested operations and transmitting the information on the probability of occurrence of the potential accident, the predicted severity of the potential accident, and the fact of performance of the one of the one or more suggested operations to the user terminal through the transceiver. It may be determined whether the VCU device operates normally, whether the PTO control device operates normally, and whether the ECU device operates normally by transmitting a normal operation confirmation request signal from the ACU device to the VCU device, the PTO control device, and the ECU device, respectively, and then receiving, by the ACU device, a normal operation confirmation signal from each of the VCU device, the PTO control device, and the ECU device. In addition, in some embodiment, the probability of occurrence of the potential accident may be determined to be a probability of collision between the PTO and the obstacle or person based on the change in distance from the PTO to the obstacle or person over time, and the predicted severity of the potential accident may be determined based on a predicted impact amount when the PTO collides with the obstacle or person based on a change in relative speed of the PTO with respect to the obstacle or person over time.

According to various embodiments of the present disclosure, there is provided an ACU device, in which, in a method of operating an ACU device electrically connected to an agricultural machine including a PTO in a communication system, the ACU device may include a processor, a memory, and an infrared sensor and may be electrically connected to a camera in the agricultural machine, and the processor may be configured to perform the method of operating an ACU device according to various embodiments of FIG. 7.

According to various embodiments of the present disclosure, there is provided a computer program configured to perform a method of operating an ACU device according to various embodiments of FIG. 7 and recorded on a computer-readable storage medium.

Figure 8:
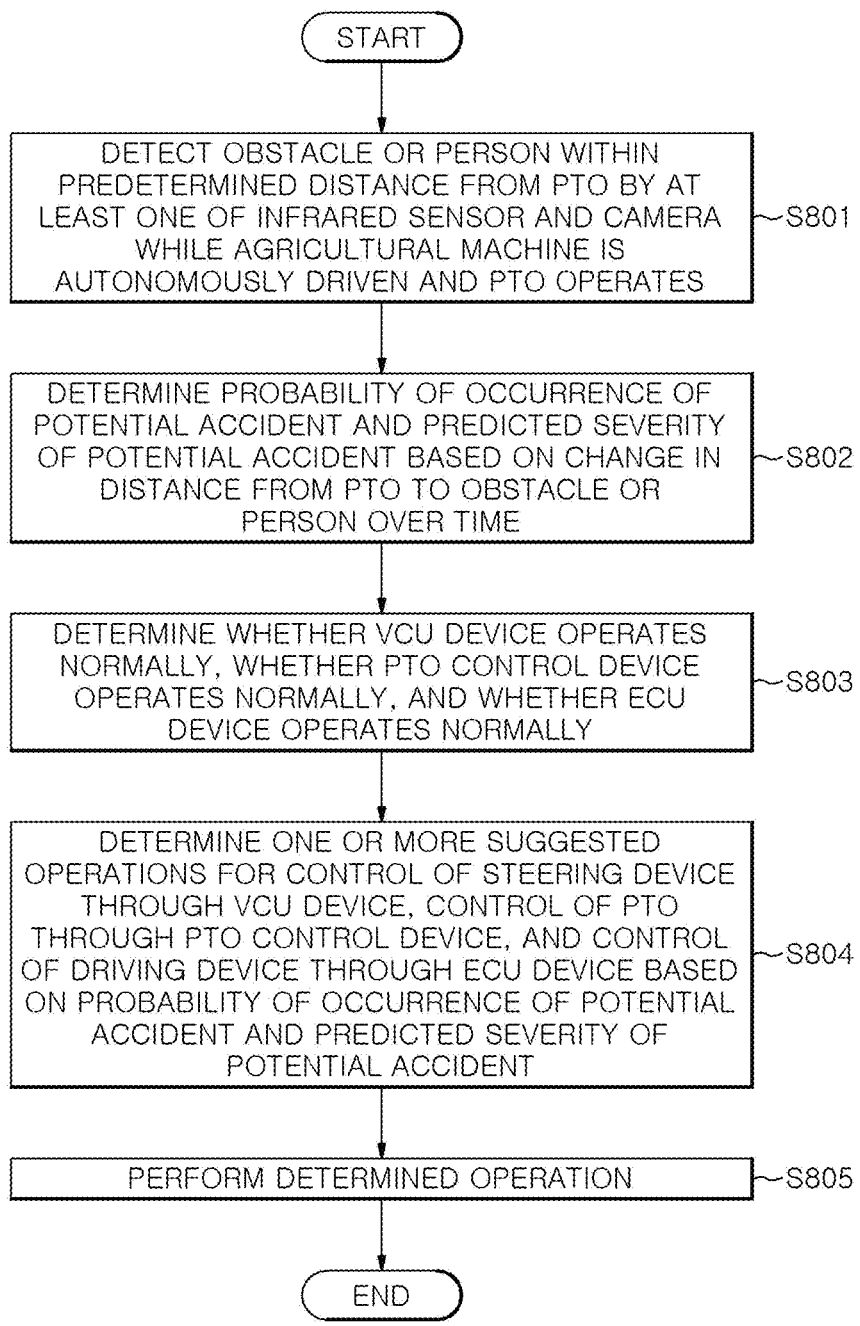
FIG. 8 illustrates another process of operating an automated-driving control unit (ACU) device according to various embodiments of the present disclosure.

Method of Operating ACU Device Electrically Connected to Agricultural Machine Including PTO FIG. 8 is a diagram illustrating a process of operating an ACU device according to various embodiments of the present disclosure. In the embodiment of FIG. 8, the ACU device is electrically connected to the agricultural machine including the PTO. The ACU device includes the processor, the memory, and the infrared sensor. The ACU device is electrically connected to the camera in the agricultural machine. The operation of the ACU device in FIG. 8 may not require a communication system, unlike the ACU operation in FIG. 7. That is, the ACU device in FIG. 8 may not include a transceiver.

Operations S801, S802, S803, S804, and S805 in FIG. 8 correspond to the operations S701, S702, S703, S704, and S705 in FIG. 7 and have similar operating principles. Therefore, below, the operations in FIG. 8 will be described focusing on the differences from FIG. 7.

Referring to FIG. 8, in operation S801, an obstacle or person within a predetermined distance from the PTO is detected by at least one of the infrared sensor and the camera while the agricultural machine performs the autonomous driving and the PTO operates.

In operation S802, a probability of occurrence of a potential accident and a predicted severity of the potential accident is determined based on the change in distance from the PTO to the obstacle or person over time.

In operation S803, it is determined whether a vehicle control unit (VCU) device electrically connected to a steering device of the agricultural machine is operating normally, whether a PTO control device electrically connected to the PTO is operating normally, and an engine control unit (ECU) device electrically connected to a driving device of the agricultural machine is operating normally.

In operation S804, the operation to avoid an accident is determined by at least one of the control of the steering device through the VCU device, the control of the PTO through the PTO control device, the control of the PTO through the PTO control device, and the control of the driving device through the ECU device based on the probability of occurrence of the potential accident and the predicted severity of the potential accident.

In operation S805, the ACU device performs the determined operation to avoid an accident.

According to various embodiment of the present disclosure, the control of the steering device through the VCU device may include the steering control of the agricultural machine in a direction to avoid the potential accident. The control of the PTO through the PTO control device may include the driving stop control of the PTO. The control of the driving device through the ECU device may include driving stop control of the agricultural machine.

According to various embodiments of the present disclosure, the operation of determining the operation to avoid an accident may include determining an operation using one of the VCU device, the PTO control device, and the ECU device in normal operation.

According to various embodiments of the present disclosure, the determining of the operation to avoid an accident by at least one of the control of the steering device through the VCU device, the control of the PTO through the PTO control device, the control of the PTO through the PTO control device, and the control of the driving device through the ECU device based on the probability of occurrence of the potential accident and the predicted severity of the potential accident is performed when the probability of occurrence of the potential accident is greater than or equal to the threshold probability. When the predicted severity is greater than or equal to the first critical severity and less than the second critical severity, one operation of the control of the steering device, the control of the PTO, and the control of the driving device may be determined. When the predicted severity is greater than or equal to the second critical severity and less than the third critical severity, one operation of the control of the PTO and the control of the driving device may be determined. When the predicted severity is greater than or equal to the third critical severity, control of the driving device may be determined. The third critical severity may be greater than the second critical severity and the first critical severity, and the first critical severity may be lower than the third critical severity and the second critical severity.

According to various embodiments of the present disclosure, the determining of the operation to avoid an accident may include: when the predicted severity is greater than or equal to the first critical severity and less than the second critical severity, determining the operation to avoid an accident under the control of the steering device through the VCU device when the VCU operates normally, determining the operation to avoid an accident under the control of the PTO through the PTO control device when the VCU does not operate normally and the PTO control device operates normally, and determining the operation to avoid an accident under the control of the driving device through the ECU device when the VCU and the PTO control device do not operate normally and the ECU device operates normally.

According to various embodiments of the present disclosure, the determining of the operation to avoid an accident may include: when the predicted severity is greater than or equal to the second critical severity and less than the third critical severity, determining the operation to avoid an accident under the control of the PTO through the PTO control device, and determining the operation to avoid an accident under the control of the driving device through the ECU device when the PTO control device does not operate normally and the ECU device operates normally.

According to various embodiment of the present disclosure, the probability of occurrence of the potential accident may be determined to be a probability of collision between the PTO and the obstacle or person based on the change in distance from the PTO to the obstacle or person over time. The predicted severity of the potential accident may be determined based on a predicted impact amount when the PTO collides with the obstacle or person based on a change in relative speed of the PTO with respect to the obstacle or person over time.

According to various embodiments of the present disclosure, it may be determined whether the VCU device operates normally, whether the PTO control device operates normally, and whether the ECU device operates normally by transmitting a normal operation confirmation request signal from the ACU device to the VCU device, the PTO control device, and the ECU device, respectively, and then receiving, by the ACU device, a normal operation confirmation signal from each of the VCU device, the PTO control device, and the ECU device.

Various embodiments of the present disclosure related to the method of FIG. 8 described above can be combined with some embodiments of the operation of FIG. 7, similar to FIG. 7.

According to various embodiments of the present disclosure, there is provided an ACU device electrically connected to an agricultural machine including a PTO in a communication system, in which the ACU device may include a processor, a memory, and an infrared sensor and may be electrically connected to a camera in the agricultural machine, and the processor may be configured to perform the method of operating an ACU device according to various embodiments of FIG. 8.

According to various embodiments of the present disclosure, there is provided a computer program configured to perform a method of operating an ACU device according to various embodiments of FIG. 8 and recorded on a computer-readable storage medium.

In the case of implementing the embodiment of the present disclosure using hardware, application specific integrated circuits (ASICs), digital signal processors (DSPs), digital signal processing devices (DSPDs), programmable logic devices (PLDs), field programmable gate arrays (FPGAs), etc., that are configured to perform the present disclosure may be provided in the processor of the present disclosure.

Meanwhile, the above-described method can be written as a program that may be executed on a computer, and can be implemented in a general-purpose digital computer that operates the programs using a computer-readable recording medium. In addition, the structure of data used in the above-described method may be recorded on a computer-readable storage medium through various means. Program storage devices, which may be used to describe a storage device including executable computer codes for performing various methods of the present disclosure, should not be construed as including transitory objects such as carrier waves or signals The computer-readable recording medium includes storage media such as magnetic storage media (e.g., a read-only memory (ROM), a floppy disk, a hard disk, etc.)

and optically readable media (e.g., a compact disc read-only memory (CD-ROM), a digital video disc (DVD), etc.).

In the embodiments described hereinabove, components and features of the present disclosure were combined with each other in a predetermined form. It is to be considered that the respective components or features are selective unless separately explicitly mentioned. The respective components or features may be implemented in a form in which they are not combined with other components or features. In addition, some components and/or features may be combined with each other to configure the embodiment of the present disclosure. A sequence of operations described in the embodiments of the present disclosure may be changed. Some components or features of any embodiment may be included in another embodiment or be replaced by corresponding components or features of another embodiment. It is obvious that claims that do not have an explicitly referred relationship in the claims may be combined with each other to configure an embodiment or be included in new claims by amendment after application.

It will be obvious to those skilled in the art that the present disclosure may be embodied in other forms without departing from the technical spirit and essential features of the present disclosure. Accordingly, the above embodiments should be considered in all respects as illustrative rather than restrictive. The scope of the present disclosure should be determined by reasonable interpretation of the appended claims and all possible changes within the equivalent scope of the present disclosure.

A method of operating an ACU device according to embodiments of the present application is useful for autonomous agricultural machines. As a result, a method of operating an ACU device according to embodiments of the present application is highly likely to be used in an agricultural industry in which the frequency of use of autonomous agricultural machines has recently increased.

The invention claimed is:

1. A method of operating an automated-driving control unit (ACU) device electrically connected to an agricultural machine including a power take off (PTO) in a communication system, the ACU device including a processor, a memory, a transceiver, and an infrared sensor and being electrically connected to a camera in the agricultural machine, the method comprising:
    detecting, by the ACU device, an object within a predetermined distance from the PTO by at least one of the infrared sensor and the camera while the agricultural machine performs autonomous driving and the PTO is in operation;
    determining, by the ACU device, a probability of occurrence of a potential accident and a predicted severity of the potential accident based on a change in distance from the PTO to the object over time;
    determining, by the ACU device, whether a vehicle control unit (VCU) device electrically connected to a steering device of the agricultural machine is operating normally, whether a PTO control device electrically connected to the PTO is operating normally, and whether an engine control unit (ECU) device electrically connected to a driving device of the agricultural machine is operating normally;
    determining, by the ACU device, one or more recommended operations for at least one of control of the steering device through the VCU device, control of the PTO through the PTO control device, and control of the driving device through the ECU device based on the determined probability of occurrence of the potential accident and the predicted severity of the potential accident;
    determining, by the ACU device, an operation direction of proactive measure post-report or proactive report post-measure based on the probability of occurrence of the potential accident and the predicted severity of the potential accident;
    when the proactive measure post-report is determined to be the operation direction, performing one of the one or more recommended operations, and transmitting information on the determined probability of occurrence of the potential accident, the predicted severity of the potential accident, and a fact of performance of the one of the one or more recommended operations to a user terminal through the transceiver; and
    when the proactive report post-measure is determined based on the operation direction, transmitting information on the determined probability of occurrence of the potential accident, the predicted severity of the potential accident, and the one or more recommended operations to the user terminal,
    when instruction information for the one of the one or more recommended operations is received from the user terminal within a predetermined time, performing one operation according to the instruction information, and
    when the instruction information for the one of the one or more recommended operations is not received from the user terminal within the predetermined time, performing the one of the one or more recommended operations and transmitting the instruction information on the determined probability of occurrence of the potential accident, the predicted severity of the potential accident, and the fact of performance of the one of the one or more recommended operations to the user terminal through the transceiver.

2. The method of claim 1, wherein the determined probability of occurrence of the potential accident is determined to be a probability of collision between the PTO and the object based on the change in distance from the PTO to the object over time, and
    the predicted severity of the potential accident is determined based on a predicted impact amount when the PTO collides with the object based on a change in relative speed of the PTO with respect to the object over time.

3. An automated-driving control unit (ACU) device electrically connected to an agricultural machine including a power take off (PTO) in a communication system, wherein the ACU device includes a processor, a memory, a transceiver, and an infrared sensor and is electrically connected to the camera in the agricultural machine, and
    the processor is configured to perform the method of claim 1.

4. A computer program, recorded on Aa non-transitory computer-readable recording medium, the computer program for performing the method of operating the ACU device electrically connected to the agricultural machine including the PTO in a communication system according to claim 1.

* * * * *